US 7,907,122 B2

(12) United States Patent
LaPointe et al.

(10) Patent No.: US 7,907,122 B2
(45) Date of Patent: Mar. 15, 2011

(54) USER INTERFACE WITH AUGMENTED SEARCHING CHARACTERISTICS

(75) Inventors: Jacques LaPointe, Calgary (CA); William J. Templeton-Steadman, Hemel Hempstead (GB); Todd Simpson, Calgary (CA)

(73) Assignee: Zi Corporation of Canada, Inc., Calgary (CA)

( * ) Notice: Subject to any disclaimer, the term of this patent is extended or adjusted under 35 U.S.C. 154(b) by 1094 days.

(21) Appl. No.: 11/294,995

(22) Filed: Dec. 6, 2005

(65) Prior Publication Data
US 2006/0158436 A1 Jul. 20, 2006

Related U.S. Application Data

(60) Provisional application No. 60/634,046, filed on Dec. 7, 2004.

(51) Int. Cl.
*G09G 5/00* (2006.01)
*G06F 3/02* (2006.01)
(52) U.S. Cl. .......................... 345/169; 345/156
(58) Field of Classification Search ................... None
See application file for complete search history.

(56) References Cited

U.S. PATENT DOCUMENTS

| | | | |
|---|---|---|---|
| 5,172,245 A | 12/1992 | Kita et al. | |
| 5,179,652 A | 1/1993 | Rozmanith et al. | |
| 5,901,246 A | 5/1999 | Hoffberg et al. | |
| 6,141,011 A | 10/2000 | Bodnar et al. | |
| 6,201,540 B1 | 3/2001 | Gallup et al. | |
| 6,246,405 B1 | 6/2001 | Johnson | |
| 6,366,302 B1 | 4/2002 | Crosby et al. | |
| 6,727,917 B1 | 4/2004 | Chew et al. | |
| 2002/0063678 A1 | 5/2002 | Wong | |
| 2003/0030666 A1 | 2/2003 | Najmi et al. | |
| 2003/0067495 A1 | 4/2003 | Pu et al. | |
| 2004/0130578 A1 | 7/2004 | Charney | |
| 2005/0071778 A1 | 3/2005 | Tokkonen | |
| 2005/0114770 A1 | 5/2005 | Sacher et al. | |
| 2005/0289480 A1* | 12/2005 | Mathews et al. .............. 715/821 |
| 2006/0015822 A1 | 1/2006 | Baig et al. | |
| 2006/0058995 A1* | 3/2006 | Fux et al. .......................... 704/9 |
| 2006/0101347 A1 | 5/2006 | Runov et al. | |
| 2006/0123360 A1 | 6/2006 | Anwar et al. | |
| 2007/0206609 A1* | 9/2007 | Peisa et al. .................... 370/400 |

OTHER PUBLICATIONS

Jern, et al.; *Visual User Interface for PDAs*; Proceedings of the Seventh International Conference on Information Visualization (IV'03); 1093-9547/03; 2003 IEEE; 6 pages.
Golshani.; *Multimedia Interfaces: Don't Move My Cheese!*; 1070-986X/06; 2006 IEEE; pp. 95-96.
Myers, et al.; *Taking Handheld Devices to the Next Level*; 0018-9162/04; 2004 IEEE; pp. 36-43.
Schreer, et al.; *Towards Robust Intuitive Vision-Based User Interfaces*; I-4244-0367-7/06; 2006 IEEE; pp. 69-72.

(Continued)

*Primary Examiner* — Alexander Eisen
*Assistant Examiner* — Robin Mishler
(74) *Attorney, Agent, or Firm* — Michael A. Glenn; Glenn Patent Group

(57) ABSTRACT

Appliances, methods and devices are disclosed in which a first selection corresponding to symbols is used to identify a non-information function. An object corresponding to the non-information function may be provided and selected to indicate a user's desire to execute tasks of the function. Upon receiving the user's selection, the function may be executed.

16 Claims, 2 Drawing Sheets

OTHER PUBLICATIONS

Keogh, et al.; *Intelligent Icons: Integrating Lite-Weight Data Mining and Visualization into GUI Operating Systems*; Proceedings of the Sixth International Conference on Data Mining (ICDM'06), 0-7695-2701-9/06; 2006 IEEE; 5 pages.

Manhartsberger, et al.; *Interaction Objects—A paradigm for intuitive user interfaces*; ISSN# 0-7803-0233-8/91; 1991 IEEE; pp. 1109-1114.

Wing, et al.; *Behaviour Sharing in Adaptable User Interfaces*; 0-8186-7525-X/96; 1996 IEEE; pp. 197-204.

Bisignano, et al.; *An "intent-oriented" approach for Multi-Device User Interface Design*; Proceedings of the 20th International Conference on Advanced Information Networking and Applications (AINA'06); 1550-445X/06; 2006 IEEE; 5 pages.

Evans, et al.; *Adaptable user interfaces for portable, interactive computer software systems*; Abstract; SIGSOC Bulletin, vol. 13, No. 2-3, Jan. 1982; one-quarter page.

Mitrovic, et al.; *Adaptive user interface for mobile devices*; Abstract; Interactive Systems Design Specification, and Verification; 9th International Workshop, DSV-IS 2002; Revised Papers (Lecture Notes in Computer Science, vol. 2545), 2002; one-half page.

Lane, et al.; *Predicting the skilled use of hierarchical menus with the keystroke-level model*; Abstract; Human-Computer Interaction; vol. 8, No. 2, 1993; one-half page.

Moore; Design of Motorola V505—cellular phone with digital camera—GSM; CNET editors' review; 3 pages.

\* cited by examiner

USER INTERFACE WITH AUGMENTED SEARCHING CHARACTERISTICS

CROSS-REFERENCE TO RELATED APPLICATION

This application claims the benefit of priority to U.S. provisional patent application Ser. No. 60/634,046, filed on Dec. 7, 2004.

FIELD OF THE INVENTION

The present invention relates to appliance, methods and devices for searching.

BACKGROUND OF THE INVENTION

There are few personal data appliances that are easy for the average user to interact with on more than one or two applications. Using a cellular telephone as an example, one finds that dialing a number is generally the only direct process that a user can invoke from the initial keypresses. Other functions available on cell phones, such as taking a photograph or sending a text message, require more than one keypress.

Access to applications or programs that are available to the user—such as the encoding of a text message or the operation of a camera or a calendar—normally requires the user to navigate to this function. This process generally relies upon a menu structure whereby each menu item offers some subsequent choice until a final choice is revealed. For example, in a typical cell phone dialer application, in order to use the user-phone book, a user must: (i) select the phone-book-function, (ii) decide whether to 'find and call' or to edit a number, (iii) locate the entry to be used, and (iv) invoke the telephony-function.

Such navigation can be accomplished by discreet button presses that move a cursor to a desired choice, followed by a keypress to select the function. The desired choice may be provided as an icon provided on a display screen. In order to ease the burden on the user, when a large display screen is available it is common to find some of the function icons provided on the display when the phone is in a resting state. In these situations, the user may select a function using a touch screen or dial a number directly from the keypad.

In some appliances, voice commands may be used to navigate to a desired function. However, such systems tend to be inconvenient and unreliable, particularly when the appliance is used in an environment having a high level of ambient noise or where the user must read from the display to continue with the command sequence. Moreover, the use of voice commands demands significant computing capability, which may impact the cost, size, or speed of the appliance.

It is desirable for appliances to operate in a manner that is intuitive to the user. That goal is difficult to achieve. One reason appliances often fail to behave in a manner intuitive to the user is that the functions available on an appliance are rarely similar. For example, the function used to take and store a photograph is different from the function used to create a text message and attach an image to the text message before sending the message.

Those people familiar with sophisticated appliances may rapidly assimilate the operational sequences necessary to use functions offered by an appliance. However, most people become discouraged when their first attempt fails to provide them access to a desired function. When users are unable to access and use such functions, users develop distrust and they will often not attempt the task again. So functions provided by an appliance frequently are not used, and the appliance is perceived as being encumbered with redundant features. Moreover, service providers do not reap the benefits that accrue from the use of functions.

Some appliance designs attempt to lead a user interactively using either a question-and-answer technique or a suggestion-and-approval technique. Both demand the user's attention to process the correct response. For example, after a telephone call has been completed some appliances compare the called number to numbers in the user phone book. If the called number is not found, the appliance will ask the user if they wish to store the number. The user selects an affirmative or negative action and the process continues from there. However, existing interactive methods are local to a function, that is to say that such methods are invoked once the user has identified a function.

SUMMARY OF THE INVENTION

The invention may be embodied as an appliance having an input device, a display and a microprocessor. The microprocessor may be in communication with the input device and the display. The microprocessor may be programmed to (a) receive a first selection from the input device, the first selection indicating one or more symbols, (b) identify a non-information function corresponding to the first selection, (c) provide a first object corresponding to the non-information function, (d) receive a second selection from the input device, the second selection indicating the object, and (e) executing the function corresponding to the indicated object.

The invention may be embodied as a method. In one such method, an input device, display and microprocessor are provided. The microprocessor may be provided in communication with the display and the input device. A first selection may be received from the input device. The first selection may indicate one or more symbols. A non-information function, which corresponds to the first selection, may be identified. A first object, which corresponds to the non-information function, may be provided. A second selection, which corresponds to the object, may be received, and the function corresponding to the object may be executed.

The invention may be embodied as a computer readable memory device. The memory device may store instructions that are executable by a computer. The instructions may be capable of causing a computer to (a) receive a first selection from an input device, the first selection indicating one or more symbols (b) identify a non-information function corresponding to the first selection, (c) provide a first object corresponding to the non-information function, (d) receive a second selection from the input device, the second selection indicating the object, and (e) execute the function corresponding to the indicated object.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
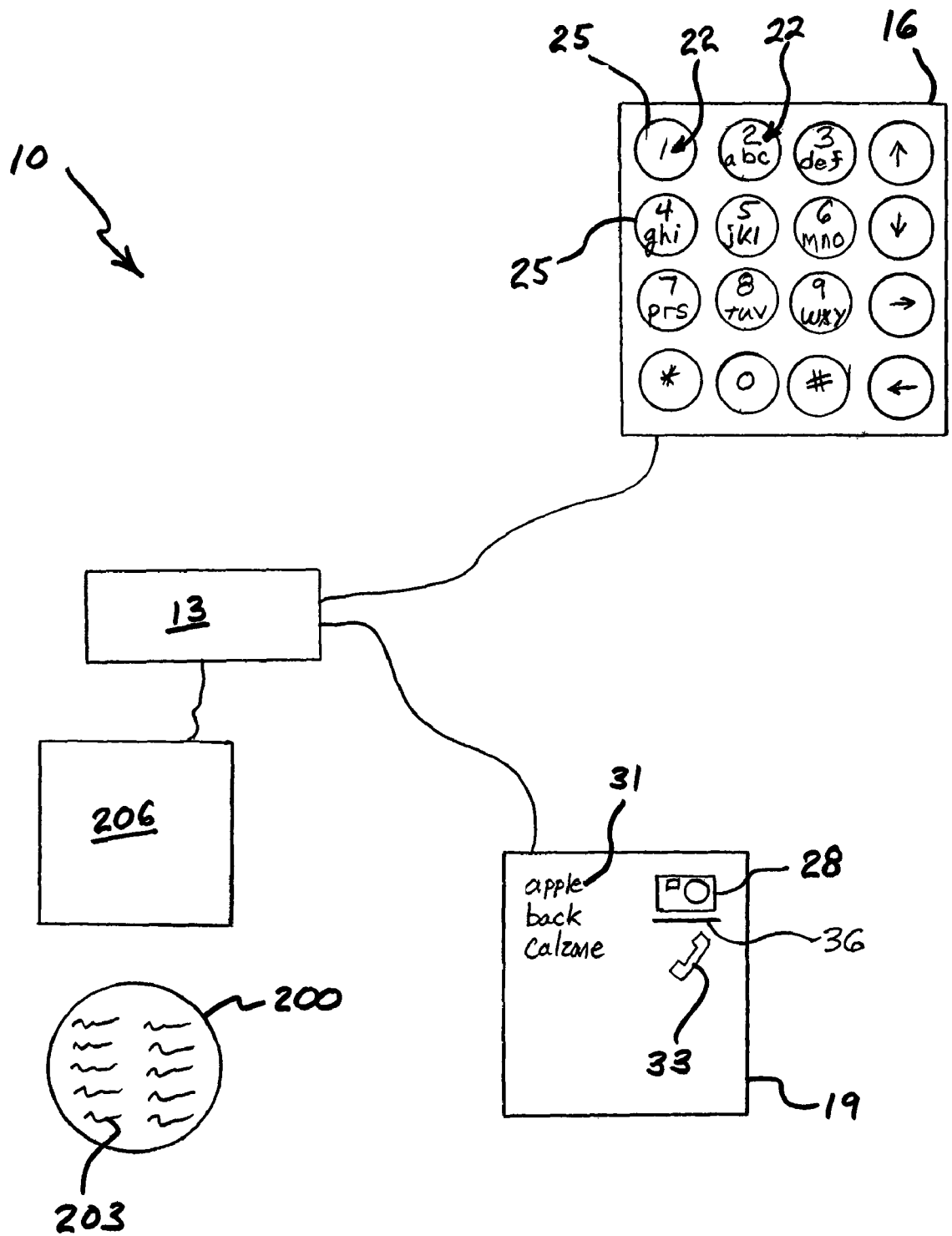
FIG. 1, which is a schematic depiction of an appliance and a device according to the invention.

The invention may be embodied as an appliance 10 which is capable of causing a function to be executed. A function may include executable code that is capable of causing a microprocessor 13 to perform a task. One such appliance 10 has an input device 16, a display 19 and a microprocessor 13. FIG. 1 depicts such an appliance 10. The microprocessor 13 may be in communication with the input device 16 and the display 19.

The input device 16 may allow a user to indicate symbols 22, for example by pressing a key such as one of the keys 25. In one such input device 16, at least one of the keys 25 is used to indicate more than one symbol 22. A symbol 22 may be a letter or number that, when combined with other symbols to form a string of symbols, identifies information or functions that may be desired by a user. A suitable input device 16 for this invention can be found on a standard telephone, which has twelve keys, eight of which have one number and three letters printed on each key. For example, one of the keys has the number "2", and also the letters "a", "b" and "c", while another key has the number "7" and the letters "p", "r" and "s". Many cell phones have software capable of decoding which of the symbols is intended by a press of a key, and such software may be used with an appliance 10 according to the invention. Often, the software uses a statistical or a deterministic model to decode key presses.

For ease of reference, the key 25 having the number "2", and also the letters "a", "b" and "c" is referred to herein as "the 2 key", and the key 25 having the number "7" and the letters "p", "r" and "s" is referred to herein as "the 7 key". Other keys 25 are identified in a similar fashion, and unless stated, such references are to keys 25 on a DTMF key pad commonly found on telephones. Although the description makes frequent reference to a DTMF type input device 16, the invention is not limited to such an input device 16.

The display 19 may use a liquid crystal display or light emitting diodes to communicate with a user. Cell phones commonly include such a display 19.

The microprocessor 13 may be programmed to receive a first selection from the input device 16. The first selection may be provided by pressing a key 25 on the input device 16 to indicate the user's desire to indicate one of the symbols 22 printed on the key 25. The microprocessor 13 may then identify a non-information function corresponding to the first selection. For example, the identified function may be a program that is executable by the microprocessor 13, such as a program for causing a photograph to be taken using a camera, or a program for causing a telephone number to be dialed.

The microprocessor 13 may provide a first object 28 corresponding to the non-information function. The first object 28 may be provided to the user by displaying the first object 28 on the display 19. The first object 28 may be a word or logo that the user is likely to associate with the function. For example, if the function is a program used to take a digital photograph, the first object 28 may be the word "camera", or the word "photo", or may be a logo recognizable as a camera.

The first object 28 may be selected using the input device 16 to provide a second selection indicating the user's desire for the object 28. Upon receiving the second selection, the microprocessor 13 may identify a function corresponding to the second selection.

Once the second selection is received, the function may be executed, which may include causing the microprocessor 13 to perform a task. For example, the appliance 10 may proceed to query the user about the photograph the user wants to take, or may proceed to query the user about the telephone call the user wants to place.

The microprocessor 13 may be programmed to identify non-function information, such as text or a phone number. Objects 31 corresponding to that non-function information may be provided via the display 19. An object 31 corresponding to non-function information is referred to herein as a "second object". Second objects 31 may be provided along with first objects 28. The second object 31 may be associated with non-function information corresponding to the first selection, and if the user selects a second object 31, the non-function information may be used within a function, for example inserted into a text message, used to dial a phone number or in some other way put to use by the microprocessor 13.

In one embodiment of the invention, an object 33 may be provided which corresponds to both a non-information function and non-function information. In that embodiment, the user may select the object 33 and be presented with a means to identify the non-information function or the non-function information. For example, the non-information function may be selectable via a logo object, and the non-function information may be selectable via a text object.

To illustrate how an appliance 10 might be used, consider a user that pressed the 2 key followed by the 2 key on her cell phone to create a two-symbol string. The microprocessor might assume that the user is trying to enter the word "camera" as part of the user's effort to inform the microprocessor 13 that the camera-function is desired. Software may be used to predict what the user is attempting to provide via the input device 16. Objects 28, 31, 33 may be indexed by assigning a numeric value to each object 28, 31, 33, and then as the keys 25 of the input device 16 are pressed, the microprocessor 13 may provide the user with objects 28, 31, 33 having a numeric value that is consistent with the pressed keys 25.

Initially, the intent of the user may be uncertain, but as the user provides additional input, the breadth of possible matches narrows. For example, if the user presses the 2 key, the microprocessor may provide a number of objects 28, 31, 33 via the display 19, such as (i) the number 2, believing the user may be providing a telephone number, (ii) a camera logo object 28, believing the user may be trying to access a function called Camera, which may be used to take photographs, and (iii) a number of text words, such as "apple", "back", and "calzone", that user recently used in text messages. The number 2 and the words "apple", "back" and "calzone" would be examples of second objects 31. If the next key press is the number 2, the display may be modified so that the "apple" object 31 is removed since the text word "apple" would have been made by pressing the 7 key, not the 2 key. As the user continues to press keys 25, more of the objects 28, 31, 33 will be removed from the display, and ultimately the user may select the desired object 28, 31, 33, for example by using a cursor 36 that is controlled via the input device 16.

Some functions may be used so often by the user that it makes sense to designate one of the keys 25 to the effort of selecting that function. For example, if the user frequently desires to take a photograph, one of the keys 25 may be associated with the camera-function so that the user need not press keys 226372 in order to take a photograph. For example, the 2 key may be designated so that when the user presses the 2 key and holds the key 25 for a specified time, the display 19 provides the camera-function object via the display 19. In response, the microprocessor 13 might cause an object 28 that resembles a camera to be provided on the display 19, and the user may then select the object 28 to provide the second selection. Upon receiving the second selection, the microprocessor 13 may identify the camera-function and proceed to take a photograph.

Alternatively, the user might press the 7 key followed by the 6 key, and the microprocessor 13 might assume that the user is trying to enter the word "photo" as part of the user's effort to inform the microprocessor 13 that the camera-function is desired. In this fashion, more than one first selection may be used to access the same function.

At this juncture, it should be noted that a user of an appliance 10 according to the invention may need to identify both a non-information function and non-function information in order to accomplish a desire end result. For example, the user might identify the telephone-function and then identify information useful in making a telephone call, such as the telephone number desired to be dialed. As another example, the user may identify a text-messaging-function, and then identify information useful in creating and/or sending a text message, such as the text or the identity of the recipient of that message. As a final example, the user may identify a camera-function, and then provide information instructing that the photograph be taken as a color photograph.

Figure 2:
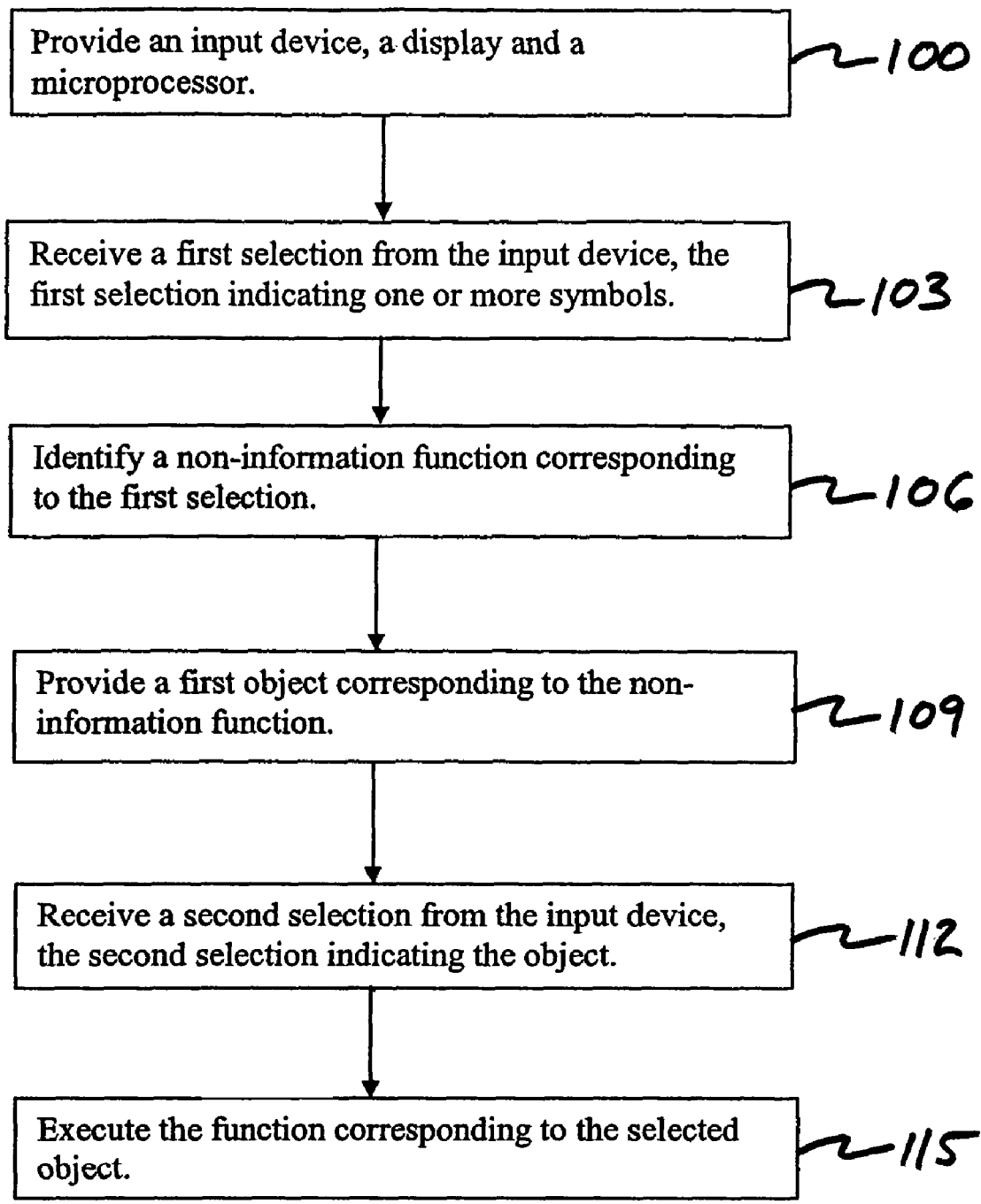
FIG. 2, which is a flow chart of a method according to the invention.

The invention may be embodied as a method of identifying a function. FIG. 2 depicts one such method. A function may include executable code in the form of a program that is capable of causing a microprocessor to perform a task. In one such method, an input device, display and a microprocessor may be provided 100. The input device may be used to allow a user to indicate symbols. For example, the user may be allowed to indicate the symbol "r" by pressing the 7 key or indicate the symbol "c" by pressing the 2 key and thereby provide a first selection. The microprocessor may be in communication with the input device so as to facilitate receiving 103 selections made by a user, and the microprocessor may be in communication with the display so as to facilitate providing 106 objects to the user via the display.

A first selection may be received 103 from the input device. The first selection may indicate one or more symbols identified by a user. A non-information function may be identified 106 by the microprocessor. The non-information function may correspond to the first selection. A first object corresponding to the non-information function may be provided 109, and the user may select that object using the input device to provide a second selection, and thereby indicate her desire to have tasks of the non-information function executed. The second selection may be received 112, and the function may be executed 115.

In addition to providing 109 the first object, other objects may be provided via the display. For example, a second object may be provided that is associated with non-function information corresponding to the first selection. In this manner, the user may be provided with objects corresponding to non-function information and objects corresponding to non-information functions. Examples of non-function information include telephone numbers and text for use in text messages. Examples of non-information functions include dialing a telephone number, taking a picture and sending a text message.

Objects corresponding to non-information functions may be accessed by more than one symbol string, and in this manner, a user may be provided 109 with a particular object by entering two or more symbol strings. For example, to access a telephone-function, the user may provide all or part of the symbol string for the word "telephone", or the symbol string for the word "phone" or the symbol string for the word "call".

The invention may be embodied as a computer readable memory device 200. Instructions 203 may be stored on the memory device 200, and those instructions 203 may be capable of causing a computer to carry out a method according to the invention. A memory device reader 206 may be used to extract the instructions 203 from the memory device 200, and provide the instructions to a computer, which may have a microprocessor like the microprocessor 13. For example, the instructions 203 may be capable of causing a computer to (a) receive a first selection from an input device, the first selection indicating one or more symbols, (b) identify a non-information function corresponding to the first selection, (c) provide a first object corresponding to the non-information function, (d) receive a second selection from the input device, the second selection indicating the object, (e) execute the function corresponding to the indicated object. As an example, the instructions 203 may cause a computer to (a) receive the symbol string "vol" as the first selection from input device, (b) identify a volume-function, (c) provide a logo resembling a speaker, (d) receive a selection of that logo, and (e) adjust the volume of the appliance on which the volume-function operates. The volume-function may be coded as 865863, since those are the keys that the user would press to provide the word "volume" via a DTMF input device. In addition, the volume-function might be coded as 76863 since those are the keys that the user would press to provide the word "sound".

Furthermore, the instructions 203 may be capable of causing a computer to provide a second object, the second object being associated with non-function information corresponding to the first selection.

As noted above, appliances, methods and memory devices according to the invention may be provided such that a particular function may be accessed using different first selections. Examples of this have been given—the most recent of which is the example where the volume-function may be accessed by providing a first selection "volume" or a first selection "sound." The appliances, methods and memory devices may also be provided such that a particular first selection results in providing objects corresponding to different functions. In one such embodiment, providing the first selection "sound" might result in providing the user with the object for the volume-control-function and also the object for the ring-tone-selection-function. By correlating different symbol strings with the same function, and correlating different functions with the same symbol string, the user may be able to access functions more easily, thereby enhancing the user's experience, and resulting in more users using more of the functions with greater satisfaction.

Once a function is selected, there may be frequent uses that may be anticipated. For example, if a user selects the camera-function of the phone, the user might want to take a photograph and store it, or may simply want to send an image as a message to a recipient without storing it, or the user may wish to send a previously stored image. In this example, selecting the camera-function might display a list of options so that the user could access the desired function with minimum navigation through what otherwise would be a lengthy procedure involving various menu structures. This ability to anticipate the user's needs may be further augmented by extending it to functions which are cross referenced to a user's entry. In this case the entry of a word like Events might offer categorical candidates such as News or Current Events which might in turn select a data stream containing real time news broadcast material or may display a list of events taking place locally from a routinely updated file maintained locally at the user's appliance but downloaded from the service center.

U.S. provisional patent application No. 60/634,046 discloses additional details about the invention and additional embodiments of the invention. The disclosure of that patent application is incorporated by this reference.

Further Examples

Some additional embodiments are described. It should be recognized that these embodiments are not intended to limit the scope of the invention. Instead, these embodiments are meant to illustrate how the illustrated system invention might be implemented.

In one embodiment, an appliance includes a standard telephonic numeric keypad (having numerals 0-9 and two ancillary keys marked with * and #). The appliance attempts to predict the user's intent as soon as an input is detected. This predictive aspect may include predicting functions that may be desired by the user. Initially, the intent of the user may be uncertain, but as the user provides additional input, the breadth of possible matches narrows quickly.

As a default setting, the appliance may assume that presses of the keys correspond to a phone number that the user desires to call. All programs or applications or device functions may be indexed by assigning a numerical value to each. As the keys are pressed, the appliance may offer to the user those contextually pertinent programs or applications or device functions having numerical values that are consistent with the pressed keys. The numeric value may be any length, and may be assigned according to a particular method.

It may be advantageous if the programs, applications or functions can be indexed in several ways. Although this is potentially burdensome in terms of memory for the appliance, modem equipment is well provisioned with significant memory set aside for some quite sophisticated applications and the benefits to the user are significant. Each feature may be automated to the extent that the user need perform only the minimum input to achieve the desired result. By way of example, in response to a user entry, the appliance may display a selection of possible user actions based upon the user's history. If a user presses the number 8, and there are telephone numbers beginning with 8 in the user's call history, some of which have been called many times, then it would be reasonable for the device to offer the most frequently called numbers as options. So, if the user had called Mary at 887 3698 and this number has been used several times in the past while, the device might show "Call Mary" as a possible user action. Modem 'Smartphones' allow a user to assign meaning to the soft (or programmable) keys and it would be simple to display "Call Mary" as a soft key assignment, selectable by a single press of that key.

Since standard keypads have numeric and alphabetic symbols permanently printed on the buttons, it may be advantageous if the numeric value chosen to represent a feature is related to the items printed on the keypad. For example, if the user wishes to adjust the volume of the appliance, it would be beneficial if the program which adjusts the volume were coded to correspond to the appearance of the letters of the word on the keypad. For example, the volume control program might be coded to correspond to 865863 since those are the buttons having the letters v-o-l-u-m-e on them. To allow a user to access the volume control program via an alternate path, the code 76863 (the keypress string corresponding to 'sound) could also be associated with the volume control program. Further, the code 76863 might also be associated with other functions, such as a ring tone program, since by entering the word "sound" on the keypad, the user might desire access to either the volume or the ring tone program. By assigning different strings to the same function, and by assigning different functions to the same string, functions may be accessed more easily by a greater number of users. The resulting ease of use, would be greatly enhance the user's experience, resulting in more users using more of the functions with greater satisfaction.

The illustrated system may be implemented in a manner similar to a thesaurus. One such embodiment is a process, features of which are depicted in FIG. 1. As an input is entered, the device searches its memory and wherever it encounters a matching item, displays the label for that item. Not shown, for the purposes of clarity of this illustration are candidates which are any matching numbers which may be whole or partial telephone number matches. When the user now selects from the list, the device retrieves, from a preprogrammed memory, functions which may be synonymous and displays them. In practice, as well as a label, this record contains pointers to the appropriate address for the function. In the illustration, the entered sequence corresponds to several candidates and the user selects "sound". This entry has numerous synonyms and displays labels that match. The user now has the opportunity to choose an interpretation that more closely matches the original intent of the request. If the user now selects "Volume" (which could have been directly accessed by entering 865 . . . ) then the device will invoke the volume control program for the user to interact with. By contrast, it might be that the 'print' function has a single dedicated program with no other associations or synonyms and would directly invoke some routine to buffer a document for printing to a printer via the preferred link such as an Infra-Red link. Synonym lists may be pre-programmed or programmed by the user to suit personal needs.

Returning now to the basic operation, when a user begins an entry, the appliance may display the numeric value of the key pressed, store the entry and search for possible matches. Initially there may be many matches. For example, the entry of a '2' may cause a number 2 to be displayed as if a telephone number were being dialed, and the appliance may also locate all possible interpretations—all numeric indices—beginning with '2'. Thus the appliance might find a program called 'Camera' which would enable a user to take a snapshot and deal with the image created, or the appliance might find 'Conference' which would enable a user to make multi-party calls and, if invoked, would interact with the user to enable such a call. The appliance may also search the user telephone directory for names and numbers which matched, finding perhaps 'Candace' in the name section and '237 8873' in a list of dialed numbers. It might further locate 'Calendar' and 'Contacts' and then display related personal data stored in the appliance. The entry of a subsequent key press, for example '2' again, might now prune the displayed list in this simple example to show '22' 'Calendar' 'Camera' and 'Candace' along with any other matching numeric entries that might be used for dialing. Each subsequent key press normally narrows the list of possible candidates until either the user chooses a candidate explicitly through a selection process, or implicitly chooses to dial the displayed number as a telephone call by pressing the 'send' key in the default mode of the appliance.

If the user sees the desired label or object shown on the display, it can be selected in any of the ways well known in the art such as moving a cursor to the item for selection. In another implementation, more commonly used labels may be appended to the "Soft Keys" so that selection is a single button press. Upon confirmation of selection, the appliance now invokes this feature as if the user had selected it using any of the more conventional methods such as operating a menu selection process.

Once a function is selected, there are often common uses that may be anticipated. For example, if a user selected Camera as a function of the phone, the user might want to take a photograph and store it, or may simply want to send an image as a message to a recipient without storing it, or the user may wish to send a previously stored image. In this example, selecting the Camera function might display a list of options so that the user could access the desired function with minimum navigation through what otherwise would be a lengthy trip through various menu structures. This ability to anticipate the user's needs may be further augmented by extending it to functions which are cross referenced to a user's entry. In this case the entry of a word like Events might offer categorical candidates such as News or Current Events which might in turn select a data stream containing real time news broadcast material or may display a list of events taking place locally from a routinely updated file maintained locally at the user's appliance but downloaded from the service center.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An apparatus comprising: an input device including multiple keys, where each key represents one or more symbols and multiple of the keys represent multiple symbols, where said symbols include at least letters and numbers; a display; and a processor in communication with the input device and the display; the processor being programmed to perform operations including: (a) providing a number of predetermined user-activated application programs, each program correlated with one of multiple predetermined icons, and each program additionally correlated with one or more predetermined words; (b) receiving identification of one or more user-selected keypresses entered via the input device; (c) identifying candidate words partially or completely spelled-out by the user-selected keypresses, with each keypress contributing one symbol represented by said keypress toward construction of a word in order of said keypresses; (d) for each candidate word correlated with one of the predetermined programs, causing the display to present the predetermined icon correlated with the predetermined program, and for each of the predetermined programs not correlated with any of the candidate words, causing the display to omit presentation of the predetermined icon correlated with said predetermined program; (e) concurrent with operation (d), causing the display to present one or more numerical sequences representing the keypresses, and causing the display to present contacts directory or calendar data responsive to said contacts directory or calendar containing any of the candidate words or numerical sequences, and causing the display to present any dialed or received telephone numbers partially or completely matching any of the numerical sequences; (f) responsive to receiving additional user-selected keypresses entered via the input device, repeating operations (c) and (d) and (e).

2. The apparatus of claim 1, where the processor is further programmed to perform operations comprising:
responsive to a candidate word being correlated with multiple predetermined programs, causing the display to present the predetermined icon correlated with each of said multiple programs.

3. The apparatus of claim 1, where said predetermined programs include any of:
commencing a pre-programmed facility of the apparatus, requiring further user input to specify an action for the processor to carry out;
the processor executing a predetermined program without further user input.

4. The apparatus of claim 1, where at least one of the predetermined programs is correlated with multiple different words having different roots.

5. The apparatus of claim 1, where correlation of words to predetermined programs is established by any of:
preprogramming of the processor;
user designation.

6. The apparatus of claim 3, where the predetermined program of commencing a pre-programmed facility of the apparatus includes:
commencing a camera facility of the apparatus, where further user input is required to specify actions including:
taking a photograph and storing said photograph;
taking a photograph and sending said photograph to a recipient without storing said photograph; and
sending a previously stored photograph.

7. The apparatus of claim 1, where the processor is programmed to perform further operations including:
responsive to the operation of receiving identification of one or more user-selected keypresses entered via the input device, displaying one or more text entries represented by the keypresses including any of: a numerical sequence, a text string, one or more of the candidate words; and
responsive to user selection of one of the displayed text entries, the processor entering the user selected text in a program requiring user input.

8. A process of operating a computer-driven apparatus including an input device including multiple keys, where each key represents one or more symbols and multiple of the keys represent multiple symbols, where said symbols include at least letters and numbers, where the apparatus includes a number of predetermined user-activated application programs, and each program is correlated with one of multiple predetermined icons, and each program is additionally correlated with one or more predetermined words, where the process comprises computer-driven operations of: (a) receiving identification of one or more user-selected keypresses entered via the input device; (b) according to the keypresses, performing operations as follows: (b1) identifying one or more candidate words partially or completely spelled-out by the user-selected keypresses, with each keypress contributing one symbol represented by said keypress toward construction of a word in order of said keypresses; (b2) for each candidate word correlated with one of the predetermined programs, causing a display to present the predetermined icon correlated with the predetermined program, and for each of the predetermined programs not correlated with any of the candidate words, causing the display to omit presentation of the predetermined icon correlated with said predetermined program; (b3) concurrent with operation (b2), causing the display to present a numerical sequence representing the keypresses; (b4) concurrent with operation (b2), causing the display to present contacts directory or calendar data responsive to said contacts directory or calendar containing any of the candidate words; (b5) concurrent with operation (b2), causing the display to present dialed or received telephone numbers partially or completely matching the keypresses; and (b6) concurrent with operation (b2), causing the display to present one or more of the candidate words.

9. The process of claim 8, further comprising the following operations responsive to the input device receiving implicit or explicit user selection of any item presented by operations (b2) through (b5):
in the case of an icon presented by operation (b2) and selected by the user, invoking the predetermined program correlated with the selected icon;

in the case of a numerical sequence presented by operation (b3) and selected by the user, dialing a telephone call using the selected numerical sequence;

in the case of a calendar or contacts entry data presented by operation (b4) and selected by the user, displaying the selected contacts or calendar data;

in the case of a dialed or received telephone number presented by operation (b5) and selected by the user, placing a telephone call to the selected dialed or received number;

in the case of a candidate word presented by operation (b6) and selected by the user, inserting the selected candidate word into a text application.

10. A process of operating a computer-driven apparatus including an input device including multiple keys, where each key represents one or more symbols and multiple of the keys represent multiple symbols, where said symbols include at least letters and numbers, where the apparatus includes a number of predetermined user-activated application programs, and each program is correlated with one of multiple predetermined icons, and each program is additionally correlated with one or more predetermined words, and the apparatus also includes a display and a processor in communication with the input device and the display, and the process comprises computer-driven operations of: (a) receiving identification of one or more user-selected keypresses entered via the input device; (b) identifying candidate words partially or completely spelled-out by the user-selected keypresses, with each keypress contributing one symbol represented by said keypress toward construction of a word in order of said keypresses; (c) for each candidate word correlated with one of the predetermined programs, causing the display to present the predetermined icon correlated with the predetermined program, and for each of the predetermined programs not correlated with any of the candidate words, causing the display to omit presentation of the predetermined icon correlated with said predetermined program; (d) concurrent with operation (c), causing the display to present one or more numerical sequences representing the keypresses, and causing the display to present contacts directory or calendar data responsive to said contacts directory or calendar containing any of the candidate words or numerical sequences, and causing the display to present any dialed or received telephone numbers partially or completely matching any of the numerical sequences; (e) responsive to receiving additional user-selected keypresses entered via the input device, repeating operations (c) and (d) and (e).

11. A computer readable storage device having stored thereon instructions that are executable by a computer, the instructions being capable of causing a computer to perform the operations of claim 8.

12. An apparatus comprising:
a keypad including multiple keys, where each key represents one or more symbols and multiple of the keys represent multiple symbols, where said symbols include at least letters and numbers;
a display; and
at least one processor in communication with the keypad and the display, the processor being programmed to perform operations including:
(a) providing a number of predetermined user-activated programs, each program correlated with one of multiple predetermined icons, and each program additionally correlated with one or more predetermined words;
(b) via the keypad, receiving signals representing a sequence of user-selected keypresses in an order, the sequence of keypresses representing an intended series of symbols, where resolution of the intended series of symbols is ambiguous because some or all of the keypresses concurrently represent multiple symbols;
(c) according to the keypresses, performing operations as follows:
(c1) identifying one or more candidate words partially or completely spelled-out by the user-selected keypresses, with each keypress contributing one symbol represented by said keypress toward construction of a word in order of said keypresses;
(c2) for each candidate word correlated with one of the predetermined programs, causing the display to present the predetermined icon correlated with the predetermined program, and for each of the predetermined programs not correlated with any of the candidate words, causing the display to omit presentation of the predetermined icon correlated with said predetermined program;
(c3) concurrent with operation (c2), causing the display to present a numerical sequence representing the keypresses;
(c4) concurrent with operation (c2), causing the display to present contacts directory or calendar data responsive to said contacts directory or calendar containing any of the candidate words;
(c5) concurrent with operation (c2), causing the display to present one or more dialed or received telephone numbers partially or completely matching the keypresses; and
(c6) concurrent with operation (c2), causing the display to present one or more independently selectable text objects each text object comprising one of the candidate words.

13. The apparatus of claim 12, the processor further programmed to perform the following operations responsive to the input device receiving implicit or explicit user selection of any item presented by operations (c2) through (c6):
in the case of an icon presented by operation (c2) and selected by the user, invoking the predetermined program correlated with the selected icon;
in the case of a numerical sequence presented by operation (c3) and selected by the user, dialing a telephone call using the selected numerical sequence;
in the case of a calendar or contacts entry data presented by operation (c4) and selected by the user, displaying the selected contacts or calendar data;
in the case of a dialed or received telephone number presented by operation (c5) and selected by the user, placing a telephone call to the selected dialed or received number;
in the case of a candidate word presented by operation (c6) and selected by the user, inserting the selected candidate word into a text application.

14. A computer readable storage device having stored thereon instructions that are executable by a computer, the instructions being capable of causing a computer to perform the operations of claim 8.

15. The apparatus of claim 1, where the user-selected keypresses include multiple keypresses of keys representing multiple symbols, and the operation (c) includes identifying candidate words partially or completely spelled-out by the user-selected keypresses including all possibilities of the multiple symbols from the keys representing multiple symbols.

16. A mobile computing device comprising:

a keypad including multiple keys, where each key represents one or more symbols and multiple of the keys represent multiple symbols, where said symbols include at least letters and numbers;

a display;

storage containing application programs, each application program having a predetermined association with at least one access word, some of the application programs associated with multiple different access words; and a processor in communication with the input device and the display; the processor programmed to perform operations including:

via the keypad, receiving signals representing a sequence of user-selected keypresses in an order, the sequence of keypresses representing an intended series of symbols, where resolution of the intended series of symbols is ambiguous because some or all of the keypresses concurrently represent multiple symbols;

interpreting the sequence of keypresses to yield multiple candidate text strings partially or completely entered by the user-selected keypresses, with each keypress contributing one symbol represented by said keypress toward construction of a text string in order of said keypresses;

concurrently performing operations comprising:

for each interpretation of the keypress sequence yielding a word, presenting each of the following for user selection: the word presented as an independently selectable text object, and a predetermined icon representing each application program having an access word matching the yielded word, and from a calendar or contacts directory any entries containing the yielded word;

for each interpretation of the keypress sequence yielding a number, presenting each of the following for user selection: a raw numerical sequence representing the keypresses, and any dialed and/or received telephone numbers partially or completely matching the number, and from a calendar or contacts directory any entries containing the number;

responsive to user input selecting one of the presented text objects, entering the text object into an application program utilizing text input;

responsive to user input selecting one of the presented icons, activating the program represented by the icon independent of any particular data object;

responsive to user input selecting a presented number, entering the number into a dialer or an application program utilizing text or numerical input;

responsive to user input selecting a presented dialed or received telephone number, initiating a telephone call to the selected number; and responsive to user input selecting a presented calendar or contacts directory entry, displaying or editing the selected entry.

* * * * *